(No Model.)

C. SCHULZE.
FENCE WIRE COUPLING DEVICE.

No. 536,940. Patented Apr. 2, 1895.

Witnesses:

Inventor
Chas. Schulze,
By Joseph L. Atkins
Attorney

UNITED STATES PATENT OFFICE.

CHARLES SCHULZE, OF DEER PLAIN, ILLINOIS.

FENCE-WIRE-COUPLING DEVICE.

SPECIFICATION forming part of Letters Patent No. 536,940, dated April 2, 1895.

Application filed April 20, 1894. Serial No. 508,351. (No model.)

*To all whom it may concern:*

Be it known that I, CHARLES SCHULZE, of Deer Plain, county of Calhoun, State of Illinois, have invented certain new and useful Improvements in Fences, of which the following is a specification, reference being had to the accompanying drawings.

The object of my invention is to produce an improved coupling device for fences by which sections of fence may be firmly fastened together when desired, or may be conveniently detached at will.

My coupling device, although especially applicable to wired picket fences, may be used to advantage upon other kinds, and the variety referred to is shown for the purpose of illustration.

Figure 1:
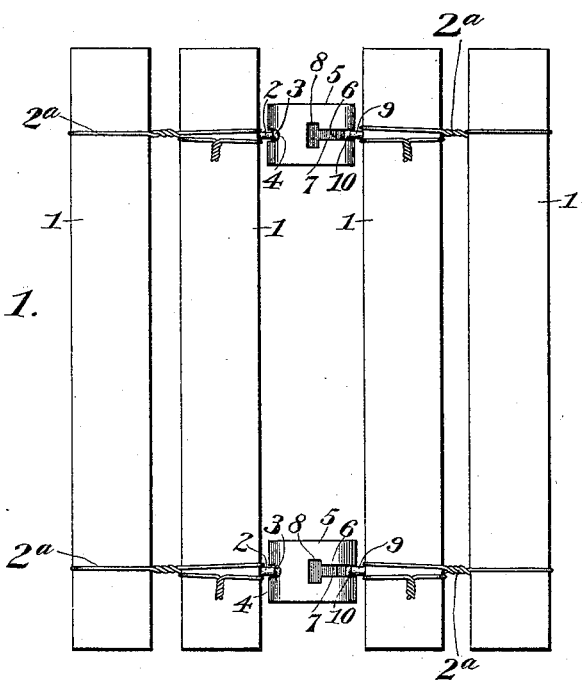
Figure 2:
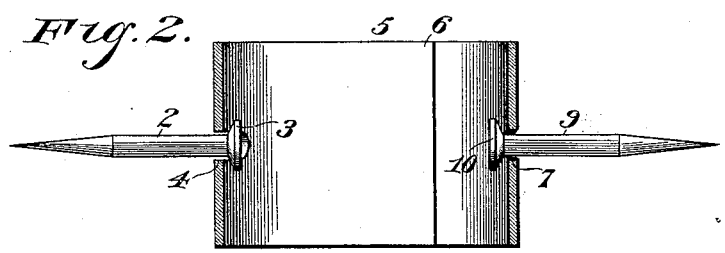
Figure 3:
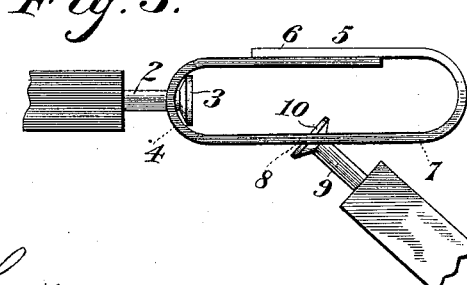

In the accompanying drawings, Figure 1 is a side elevation of two sections of a fence united by my coupling. Fig. 2 is a longitudinal section of the coupling and pins detached. Fig. 3 is a top plan view of one of the couplings and showing the pin in the disengaging position.

Referring to the figures on the drawings, 1 indicates the pickets and 2ª wires which unite them to form a fence. In this variety of fence two or more courses of wire may be used, and I preferably employ, opposite each of the courses, a coupling pin 2 provided with an enlarged head 3. These pins enter recesses 4, which are preferably slotted, in the coupler 5 and serve to loosely hold the coupler to one section of the fence. The coupler or coupling piece is preferably made of sheet metal and is bent into the link form in which it is illustrated, their overlapping ends being clearly indicated at 6 in the drawings.

7 indicates a long, narrow slot extending preferably from one end of the coupler to the middle of one side thereof and terminating in a transverse recess 8.

9 indicates a coupling pin and 10 the broad head thereof. The coupling pin 9 is secured to the section of fence to be united to the coupler and may be driven into the picket, or be secured to the wire in any suitable manner. Any suitable means for securing the coupling pins to the picket may be provided if necessary.

In uniting the sections of fence, the head of the pin 9 is inserted into the transverse recess and the pin is slipped through the slot 7 until it reaches the bend of the coupler and the draft thereon is made in the line of its length, when the coupling pin 9 is firmly held by its head which, although it may enter the recess 8 is sufficiently large to prevent its escape through the slot 7. In this manner a perfectly safe coupling is provided, together with means for readily separating the sections of fence which it unites whenever it should be desired to do so.

What I claim is—

A fence coupling piece made of sheet metal bent to form a link and provided with an aperture in one end whereby the coupling piece may be revolubly mounted upon a coupling pin, and with a transverse recess and a slot extending therefrom, toward and terminating at the opposite end of the coupling piece, whereby it may be detachably secured to another coupling pin, substantially as specified.

In testimony of all which I have hereunto subscribed my name.

CHARLES SCHULZE.

Witnesses:
 JOSEPH MYER,
 LINN LOVE.